United States Patent
Matsumoto

(10) Patent No.: US 8,708,011 B2
(45) Date of Patent: Apr. 29, 2014

(54) PNEUMATIC TIRE WITH TREAD HAVING SIPES

(75) Inventor: Hiroyuki Matsumoto, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 983 days.

(21) Appl. No.: 12/651,511

(22) Filed: Jan. 4, 2010

(65) Prior Publication Data

US 2010/0218867 A1     Sep. 2, 2010

(30) Foreign Application Priority Data

Mar. 2, 2009   (JP) ................................ 2009-048403

(51) Int. Cl.
*B60C 11/12*     (2006.01)

(52) U.S. Cl.
USPC ............ 152/209.21; 152/209.23; 152/209.24; 152/DIG. 3; 152/902

(58) Field of Classification Search
USPC ............. 152/209.21, 209.23, 209.24, DIG. 3, 152/902
See application file for complete search history.

(56) References Cited

U.S. PATENT DOCUMENTS

| | | | |
|---|---|---|---|
| 6,719,024 B2 | 4/2004 | Kuze | |
| 7,077,180 B2 | 7/2006 | Kuze | |
| 7,143,799 B2 * | 12/2006 | Collette et al. ............ | 152/DIG. 3 |
| 2002/0170643 A1 * | 11/2002 | Kuze ........................ | 152/209.18 |
| 2008/0163970 A1 * | 7/2008 | Ohara ........................ | 152/523 |
| 2010/0084062 A1 * | 4/2010 | Miyazaki et al. ........ | 152/209.18 |
| 2011/0120610 A1 * | 5/2011 | Fugier et al. ............. | 152/209.21 |

FOREIGN PATENT DOCUMENTS

| | | |
|---|---|---|
| DE | 3531047 A1 | 3/1987 |
| DE | 10101507 A1 | 8/2002 |
| EP | 213452 A2 * | 3/1987 |
| EP | 847878 A2 * | 6/1998 |
| EP | 847878 A2 | 6/1998 |
| EP | 0 933 235 | 8/1999 |
| JP | 02-310108 A * | 12/1990 |
| JP | 07-276923 A * | 10/1995 |
| JP | 09-272312 | 10/1997 |
| JP | 2003-136541 | 5/2003 |
| JP | 2005-104194 | 4/2005 |
| JP | 2005-104194 A * | 4/2005 |
| JP | 2005-329793 | 12/2005 |
| JP | 2005-329793 A * | 12/2005 |
| WO | WO-2009/077499 A1 * | 6/2009 |

OTHER PUBLICATIONS

Machine translation for Japan 2005-329793 (no date).*
Translation for Japan 02-310108 (no date).*

(Continued)

*Primary Examiner* — Steven D Maki
(74) *Attorney, Agent, or Firm* — Fish & Richardson P.C.

(57) ABSTRACT

The present invention has an object to provide a pneumatic tire having a sipe, which can increase ice braking performance without reducing anti-wear performance. The pneumatic tire includes: a plurality of land portions 4 partitioned by grooves 2 and 3 and formed in a tread surface 1a; and at least one sipe 5 formed in each of the land portions 4, wherein the sipe 5 is formed so that sipe inner wall surfaces 6 and 6 are formed perpendicularly to the tread surface 1a, one or more recesses 7 exposed on the tread surface 1a are formed in at least one of the sipe inner wall surfaces 6 and 6 opposed to each other, the recess 7 has a sectional area gradually decreasing from an opening end of the sipe 5 toward a sipe bottom 8 and converges on the sipe inner wall surface 6 before reaching the sipe bottom 8.

6 Claims, 6 Drawing Sheets

(56) References Cited

OTHER PUBLICATIONS

Machine translation for Europe 213452 (no date).*
Machine translation for Japan 07-276923 (no date).*
Machine translation for Japan 2005-104194 (no date).*
Machine translation for Europe 847878 (no date).*
German Search Report for Patent Application No. 10 2010 005 840.8 dated Jul. 29, 2010, 4 pages.

* cited by examiner

FIG. 1
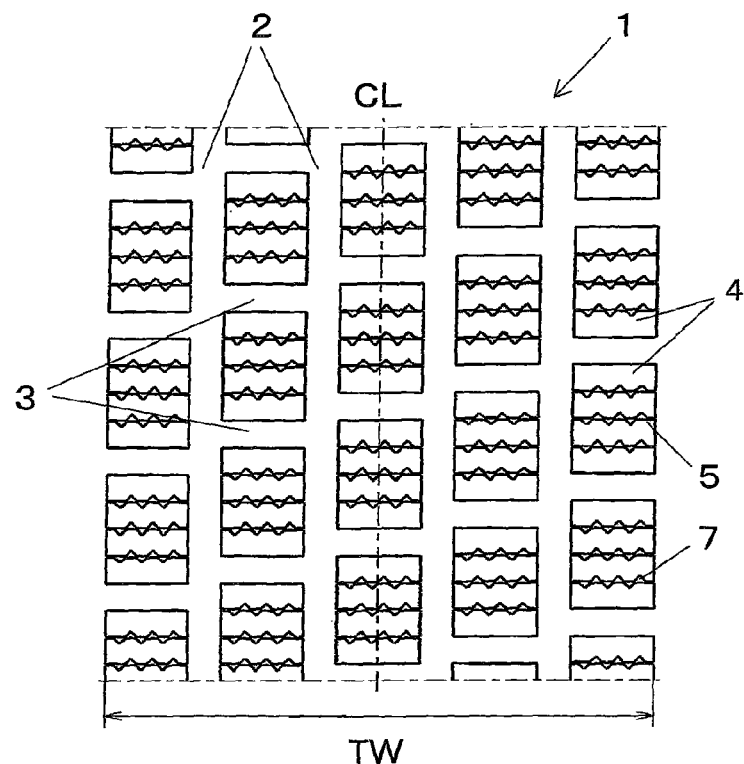
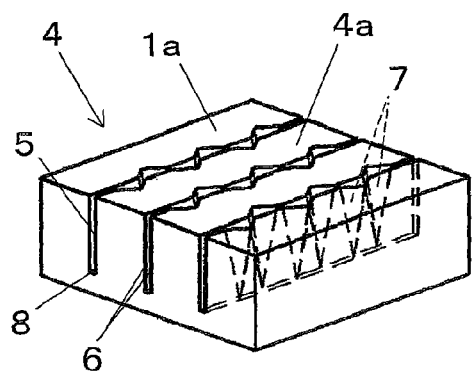
FIG. 2A
FIG. 2B
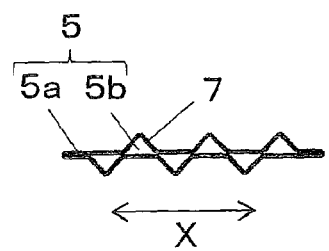

PNEUMATIC TIRE WITH TREAD HAVING SIPES

BACKGROUND OF THE INVENTION

1. Field of the Invention

The present invention relates to a pneumatic tire having a sipe cut into a land portion formed in its tread surface, and more particularly to a pneumatic tire useful as a studless tire.

2. Description of the Related Art

Generally, a studless tire has a sipe cut into in a rib or a block as a land portion formed in a tread surface, and thus increases a water removing effect of the sipe and an edge effect of a sipe edge to increase braking performance on an icy road (ice braking performance).

However, in the pneumatic tire, the increasing of the number of sipes formed in the land portion causes a land piece surrounded by the sipes to be easily deformed by a load applied to the tire. Thus, adjacent land pieces are brought into tight contact with each other to close the sipe and reduce the edge effect and the water removing effect of the sipe, thereby preventing sufficient ice braking performance from being provided.

To solve the above-described problem, for example, in Japanese Patent Laid-Open No. 9-272312, a wide section is formed that is a part of a sipe extended from a tread surface to a sipe groove bottom with a fixed width, and thus the wide section is always opened even when the sipe is closed, thereby ensuring a water removing effect and an edge effect for the purpose of the increasing of ice braking performance.

However, in Japanese Patent Laid-Open No. 9-272312, the wide section is formed from the tread surface to the sipe groove bottom with the fixed width, which may easily reduce the rigidity of its land portion (rib or block). Particularly, when a plurality of wide sections are formed in one sipe to sufficiently ensure a water removing effect and an edge effect of the sipe, the rigidity of the entire land portion is significantly reduced. Thus, in Japanese Patent Laid-Open No. 9-272312, when a large load is applied to a tire, the land section is excessively deformed to reduce the edge effect and the water removing effect to the contrary. Also, when the wide section is formed in a land piece between sipes, there is a large difference between a low rigidity portion and a high rigidity portion in the land piece, which may easily cause uneven wear on a land piece between the sipes and reduce anti-wear performance.

Thus, in view of the above-described problems, the present invention has an object to provide a pneumatic tire having a sipe, which can increase ice braking performance without reducing anti-wear performance.

SUMMARY OF THE INVENTION

To achieve the above-described object, the present invention provides a pneumatic tire including: a plurality of land portions partitioned by grooves and formed in its tread surface; and at least one sipe formed in the land portions, wherein the sipe is formed so that sipe inner wall surfaces are formed perpendicularly to the tread surface, one or more recesses exposed on the tread surface are formed in at least one of the sipe inner wall surfaces opposed to each other, the recess has a sectional area gradually decreasing from an opening end of the sipe toward a sipe bottom and converges on the sipe inner wall surface before reaching the sipe bottom. The land portion means a block and a rib.

With the above-described configuration, the recess exposed on the tread surface is formed tapered so that the sectional area gradually decreases toward the sipe bottom and the recess converges on the sipe inner wall surface before reaching the sipe bottom, thereby allowing the rigidity of the entire land portion to be maintained. Also, the recess is always opened in the tread surface, and thus a space in the recess can be used to increase a water removing effect and a recess opening edge can be used to increase an edge effect, thereby increasing ice braking performance. In other words, in the present invention, the recess is formed in the sipe inner wall surface to form, in the sipe, a wide section having a larger width than a sipe groove, and the wide section is formed tapered toward the sipe bottom.

Further, the recess is tapered to reduce a difference in rigidity in the land portion and prevent uneven wear on a land piece between sipes, thereby allowing anti-wear performance equal to that of a sipe without a recess formed in a sipe inner wall surface to be maintained. The recess is formed so that the sectional area gradually decreases toward the sipe bottom, and thus there is no inflection point that easily causes buckling deformation, allowing the water removing effect and the edge effect of the sipe to be maintained at a high level.

One recess may be formed in the sipe inner wall surface, but a plurality of recesses are formed in at least one of the sipe inner wall surfaces at intervals in a sipe length direction along the tread surface, thereby increasing the water removing effect and the edge effect in a wide range of the sipe and further increasing ice braking performance. Further, the recesses are formed at intervals in a distributed manner in the land portion, thereby allowing the rigidity of the land portion to be equalized and preventing uneven wear on a land piece between sipes.

The recess may be formed in one of the sipe inner wall surfaces or in each of the sipe inner wall surfaces opposed to each other (referred to as a first inner wall surface and a second inner wall surface). In this case, the recesses formed in the first inner wall surface and the second inner wall surface opposed to each other are placed to be shifted from each other in the sipe length direction, thereby more efficiently increasing the water removing effect and the edge effect in a wide range of the sipe. When this configuration is viewed from the side of the land piece, the recesses are placed to be shifted from each other in opposite surfaces of the land section piece (sipe inner wall surfaces), thereby allowing the rigidity of the land portion to be equalized and preventing uneven wear on a land piece between sipes.

In the pneumatic tire of the present invention, the recess is formed tapered so that its sectional area gradually decreases in a sipe depth direction, and thus the sectional area of the recess exposed on the tread surface decreases in accordance with the wear of the tire to reduce the water removing effect and the edge effect by the recess. However, the height of the land section is also reduced by wear and the land portion becomes hard to be deformed, and thus the sipe becomes hard to be closed. Thus, even with the tire wearing, the original water removing effect and edge effect of the sipe can be exhibited to satisfactorily maintain the ice braking performance.

However, according to usage or tread patterns of the tire, the sipe is closed in some cases in accordance with the tire wearing to some extent. Thus, the present invention may adopt a configuration in which, in addition to the above-described recess, an inverted recess having a sectional area gradually decreasing from the sipe bottom toward the sipe opening in a direction opposite to a direction of the above-described recess is formed from the sipe bottom of the sipe inner wall surface so as to converge on the sipe inner wall surface before reaching the opening end of the sipe. In other words, in the present invention, in addition to the wide section, an inverted wide section tapered from the sipe bottom toward the sipe opening in a direction opposite to a direction of the wide section is formed in the sipe.

With the above-described configuration, as the tire wears and the sectional area of the recess exposed on the tread surface decreases, the sectional area of the inverted recess exposed on the tread surface increases, thereby allowing the water removing effect and the edge effect of the sipe to be maintained.

The inverted recess may be formed in one of the sipe inner wall surfaces or in each of the first inner wall surface and the second inner wall surface opposed to each other. In this case, the inverted recesses formed in the first inner wall surface and the second inner wall surface opposed to each other are preferably placed to be shifted from each other in the sipe length direction. Specifically, when this configuration is viewed from the side of the land piece, as described above, the inverted recesses are placed to be shifted from each other in opposite surfaces of the land piece, thereby allowing the rigidity of the land portion to be equalized and preventing uneven wear on a land piece between sipes.

The pneumatic tire according to the present invention also has an advantage that the tire can be easily molded. Specifically, in molding a tire, a split mold formed by circumferentially dividing a die into a plurality of parts is used. A sipe blade for forming a sipe is provided to stand on an inner peripheral surface of the split mold, and after the tire is molded, the split mold is moved radially outward of the tire and opened.

At this time, the sipe blade is drawn out radially outward of the tire, and thus the resistance that occurs between the sipe blade and tread rubber is desirably low in drawing out. On the sipe blade used for molding of the pneumatic tire according to the present invention, a wide section for forming the recess in the sipe inner wall surface is provided in a protruding manner. Further, in addition to the wide section, an inverted wide section for forming the inverted recess in the sipe inner wall surface is occasionally provided in a protruding manner. Thus, these wide sections may increase resistance in the drawing out of the sipe blade.

However, since the wide section is exposed on the tread surface and also formed tapered toward the sipe bottom, no resistance occurs between the sipe blade and the tread rubber in mold opening. On the other hand, the inverted wide section passes through the tread rubber from the sipe bottom to the tread surface in mold opening, and at this time, resistance occurs between the sipe blade and the tread rubber.

However, even in this case, the inverted wide section is formed tapered toward the sipe opening, and the tapered side is a front end in the drawing out of the sipe blade. Thus, there is no catch between the sipe blade and the tread rubber, thereby allowing the sipe blade to be smoothly drawn out with low resistance while gradually elastically deforming the tread rubber. This can provide a pneumatic tire that can be easily molded without damage in mold opening.

In the present invention, the sipe inner wall surfaces are formed perpendicularly to the tread surface, one or more recesses exposed on the tread surface are formed in at least one of the sipe inner wall surfaces, and the recess has the sectional area gradually decreasing from the opening end of the sipe toward the sipe bottom. This can provide a pneumatic tire having increased ice braking performance and anti-wear performance.

BRIEF DESCRIPTION OF THE DRAWINGS

FIG. 1 is a plan view of a tread pattern of a pneumatic tire according to a first embodiment of the present invention;

FIG. 2A is a perspective view of a block in FIG. 1;
FIG. 2B is a plan view of a sipe cut into the block.

DETAILED DESCRIPTION OF THE PREFERRED EMBODIMENTS

First Embodiment

Figure 3A:
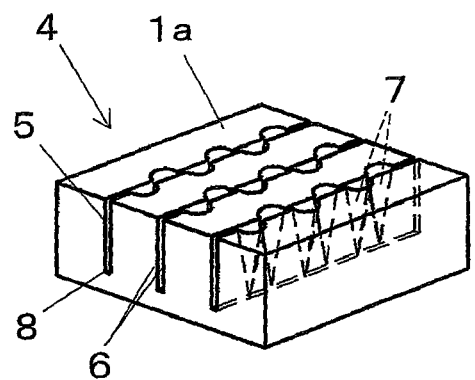
FIG. 3A is a perspective view of a second aspect of a block different from the block in FIG. 1.

FIG. 1 and FIG. 2 show a pneumatic tire of a first embodiment of the present invention. FIG. 1 is a plan view of a tread pattern on the tread section of a pneumatic tire, FIG. 2A is a perspective view of a block of the pneumatic tire, and FIG. 2B is a plan view of a sipe cut into the block. The pneumatic tire referred to herein is a radial tire, and in a surface 1a of a tread section 1, a plurality of blocks 4 are defined by a plurality of main grooves 2 formed circumferentially of the tire and a plurality of lateral grooves 3 formed to connect the main grooves 2. In this embodiment, a land section is entirely constituted by a block, but not limited to this, the land portion may be constituted by a rib and a block.

As shown in FIG. 1, a plurality of sipes 5 linearly extending in a tire width direction TW are formed in each block 4. The block 4 is partitioned by the sipes 5 into a plurality of block pieces (land pieces) 4a. The sipes 5 may be formed in the tire width direction TW, or may be formed along or diagonally to a tire equator line CL.

Sipe inner wall surfaces 6 and 6 of each sipe 5 are opposed to each other with a certain space therebetween, and formed perpendicularly to the tread surface 1a. Recesses 7 are provided in the sipe inner wall surfaces 6 and 6 opposed to each other. The recess 7 is formed to be exposed on the tread surface 1a. The recess 7 has a length in a sipe depth direction within a range before reaching a sipe bottom 8, and is formed tapered so that its sectional area (area surrounded by a recess section and a sipe inner wall surface on plan view of the recess section) gradually decreases toward the sipe bottom 8 and the recess 7 converges on the sipe inner wall surface 6 within the range. Thus, even if a load is applied to the tire and the sipe inner wall surfaces 6 and 6 opposed to each other are brought into tight contact with each other, the recess 7 is always opened to increase ice braking performance. Further, the recess 7 is formed tapered in the sipe depth direction, thereby allowing the rigidity of the block 4 to be satisfactorily maintained and preventing uneven wear on a land piece between sipes.

A plurality of recesses 7 having the above-described shape are formed at regular intervals in each of the sipe inner wall surfaces 6 and 6 opposed to each other. A space between the recesses 7 in one surface is equal to the width of one recess. The recesses 7 in the sipe inner wall surfaces 6 and 6 opposed to each other are alternately placed to be shifted from each other by a space of one recess in a sipe length direction X. Thus, the recesses 7 can be placed in the entire sipe length direction, thereby efficiently increasing a water removing effect and an edge effect of the sipe. For one sipe inner wall surface 6, a space of one recess 7 is provided between the recesses 7, thereby avoiding such trouble that a width between the recesses becomes excessively narrow to easily cause chipping of rubber of this portion.

When the above-described configuration is viewed from the side of the block piece 4a, the recesses 7 formed in opposite side surfaces 6 and 6 of the block piece 4a (sipe inner wall surfaces) are placed to be shifted from each other by a space of one recess in the sipe length direction X, thereby allowing rigidity of the block piece 4a to be equalized and preventing uneven wear on a land piece between sipes.

For the sipe 5, the configuration with the plurality of recesses 7 formed in the sipe inner wall surface 6 is, as shown in FIG. 2B, a configuration in which a plurality of wide sections 5b each having a larger width than a sipe groove 5a are formed in a part of the sipe groove 5a having a fixed width.

The recess 7 preferably has a recess width (length of the wide section 5b) in the sipe length direction X of 1.0 mm to 4.0 mm, and a recess depth (width of the wide section 5b) of 0.5 mm to 2.0 mm.

Figure 3B:
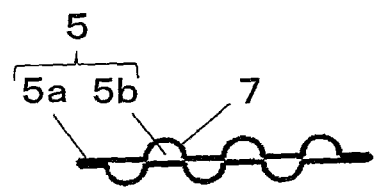
FIG. 3B is a plan view of a sipe cut into the block.
Figure 4A:
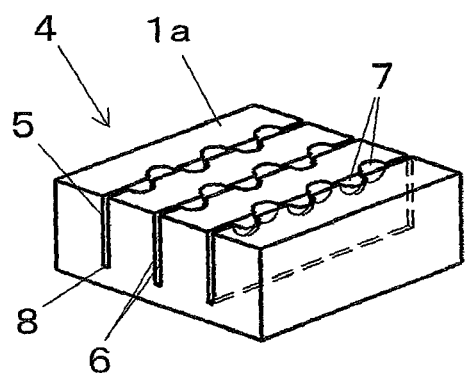
FIG. 4A is a perspective view of a third aspect of a block different from the block in FIG. 1.
Figure 4B:
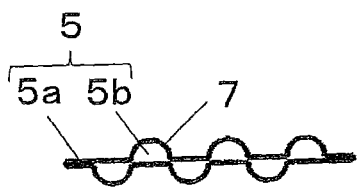
FIG. 4B is a plan view of a sipe cut into the block.

In this embodiment, the recess 7 has a V-shaped sectional shape as shown in FIGS. 1 and 2, and in its entirety has a triangular pyramidal shape, but not limited to this, for example, the recess 7 may in its entirety has a polygonal pyramidal shape or a semi-conical shape as shown in FIG. 3. For the length of the recess 7 in the sipe depth direction, the recess 7 may converge on the sipe inner wall surface 6 before reaching the sipe bottom 8. For example, the recess 7 may have a semi-spherical shape as shown in FIG. 4.

Figure 5A:
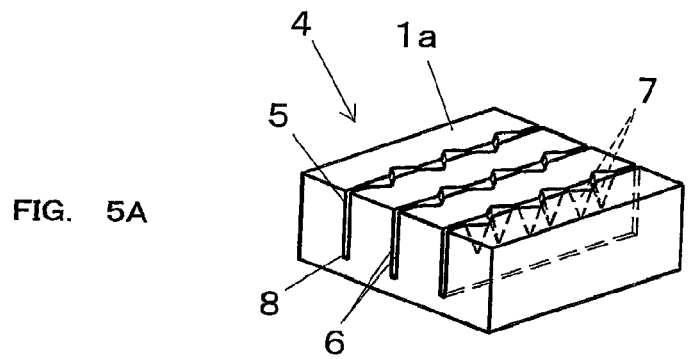
FIG. 5A is a perspective view of a fourth aspect of a block different from the block in FIG. 1.
Figure 5B:
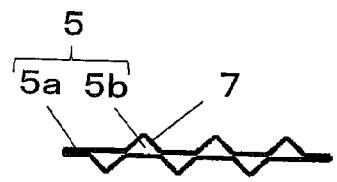
FIG. 5B is a plan view of a sipe cut into the block.
Figure 6:
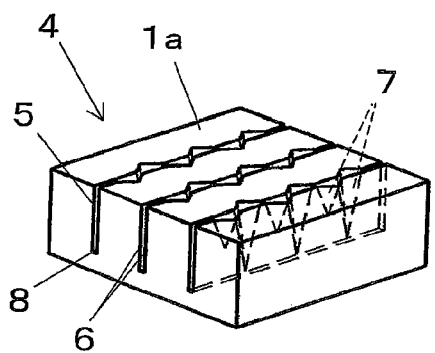
FIG. 6 is a perspective view of a fifth aspect of a block different from the block in FIG. 1.
Figure 7:
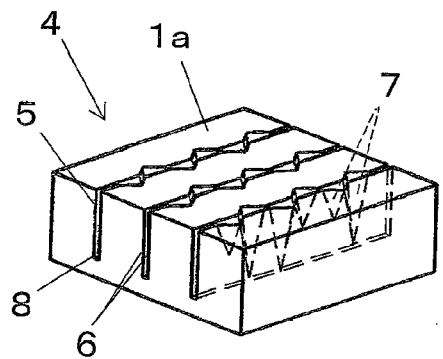
FIG. 7 is a perspective view of a sixth aspect of a block different from the block in FIG. 1.
Figure 8A:
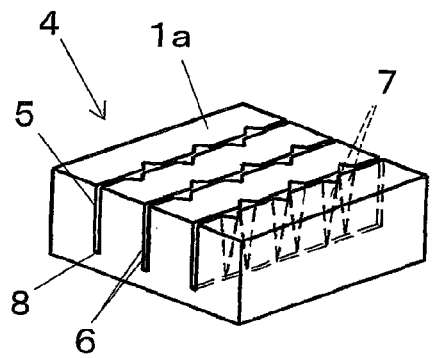
FIG. 8A is a perspective view of a seventh aspect of a block different from the block in FIG. 1.
Figure 8B:
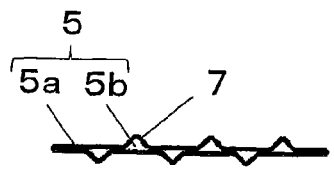
FIG. 8B is a plan view of a sipe cut into the block.
Figure 9A:
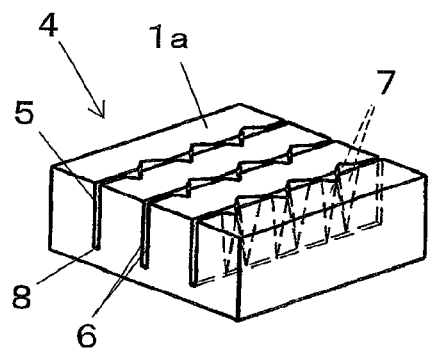
FIG. 9A is a perspective view of an eighth aspect of a block different from the block in FIG. 1.
Figure 9B:
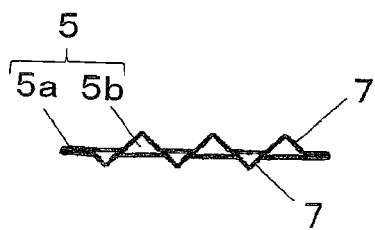
FIG. 9B is a plan view of a sipe cut into the block.

However, in view of the water removing effect and the edge effect by the recess, the length of the recess 7 in the sipe depth direction is preferably one third or more of the sipe depth as shown in FIG. 5. Also, recesses with different lengths in the sipe depth direction may be combined as shown in FIGS. 6 and 7. Further, the width of the recess 7 may be reduced as shown in FIG. 8, or recesses 7 with different widths may be combined as shown in FIG. 9.

Second Embodiment

Figure 10A:
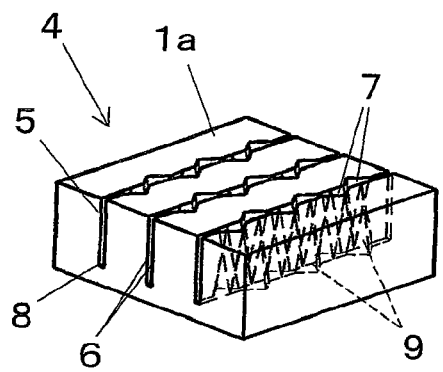
FIG. 10A is a perspective view of the block of a pneumatic tire according to a second embodiment of the present invention.
Figure 10B:
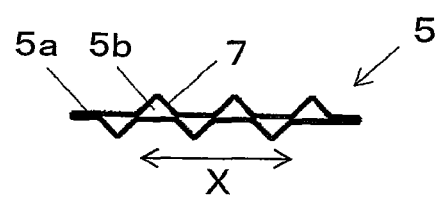
FIG. 10B is a plan view of a sipe cut into the block of a pneumatic tire according to a second embodiment of the present invention.
Figure 10C:
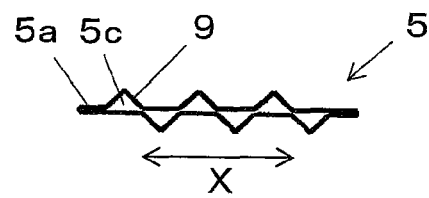
FIG. 10C is a bottom view of the sipe of a pneumatic tire according to a second embodiment of the present invention.

FIG. 10 shows a pneumatic tire according to a second embodiment, FIG. 10A is a perspective view of a block of the pneumatic tire, FIG. 10B is a plan view of a sipe cut into the block, and FIG. 10C is a sectional view of the block taken on a sipe bottom (bottom view of the sipe). This embodiment has a feature in that an inverted recess 9 is provided in addition to the recess 7 formed in each of the sipe inner wall surfaces 6 and 6 opposed to each other. Other configurations including a tread pattern of a tread section are the same as in the first embodiment.

Specifically, in the first embodiment, the space for one recess is provided between the recesses 7, while in this embodiment, an inverted recess 9 is formed in the space between the recesses 7, and thus the recess 7 and the inverted recess 9 are alternately placed. Specifically, inverted recesses formed in the sipe inner wall surfaces 6 and 6 opposed to each other are placed to be shifted from each other in a sipe length direction. Between the sipe inner wall surfaces 6 and 6 opposed to each other, in the same position as the recess 7 formed in one surface, an inverted recess 9 is formed in the other opposed surface.

The inverted recess 9 is formed to converge on the sipe inner wall surfaces 6 from a sipe bottom of the sipe inner wall surface 6 to an opening end of the sipe. In this embodiment, the inverted recess 9 has a length in a sipe depth direction from the sipe bottom 8 to the opening end of the sipe, has a V-shaped sectional shape, and is formed tapered so that its sectional area (area surrounded by an inverted recess section and a sipe inner wall surface on plan view of the inverted recess section) gradually decreases toward the opening end of the sipe.

In the above-described configuration, the sectional area of the recess 7 decreases while the sectional area of the inverted recess 9 increases in accordance with wear of the tire, thereby allowing the water removing effect and the edge effect of the sipe to be satisfactorily maintained. When the inverted recess is formed, the rigidity of the land portion may be somewhat reduced, but both the recess and the inverted recess are formed tapered, thereby allowing the rigidity of the land portion to be satisfactorily maintained as compared with the case where a recess is formed from the opening end of the sipe 5 to the sipe groove bottom with a fixed depth from the sipe inner wall surface.

The inverted recess 9 may be positioned in view of the rigidity of the land portion and the water removing effect and the edge effect of the sipe in wearing of the tire, and the recess 7 and the inverted recess 9 may be alternately placed as in this embodiment, or one inverted recess 9 may be placed for a plurality of recesses 7. The inverted recess 9 in its entirety has a triangular pyramidal shape (oriented in a direction opposite to that of the recess 7) like the recess 7, but not limited to this, for example, the inverted recess 9 may in its entirety has a polygonal pyramidal shape or a semi-conical shape.

With the above-described configuration, the sipe 5 of this embodiment includes the sipe groove 5a having a fixed width, a plurality of wide sections 5b having a larger width than the sipe groove 5a in a part of the sipe groove 5a, and an inverted wide section 5c oriented in a direction opposite to that of the wide section 5b. The wide section 5b is formed by the recess 7, and the inverted wide section 5c is formed by the inverted recess 9.

Figure 11:
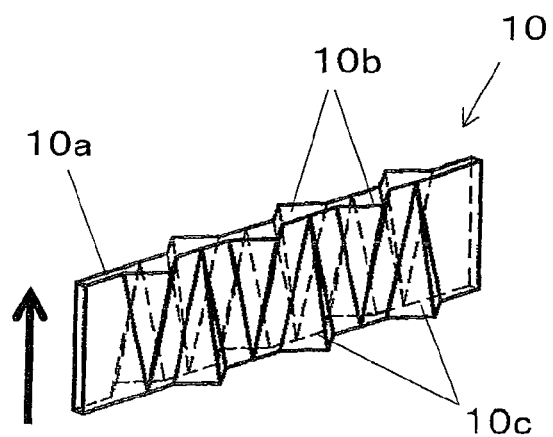
FIG. 11 is a perspective view of a sipe blade for forming a sipe in the second embodiment.

FIG. 11 is a perspective view of a sipe blade used for forming the sipe in this embodiment. In FIG. 11, a sipe blade 10 is provided to stand with a top surface thereof in contact with an inner peripheral surface of a split mold. The shape of the sipe blade 10 in FIG. 11 is equal to the shape of the sipe 5. The sipe blade 10 includes a blade body 10a, a wide section 10b for forming the recess 7 in the sipe inner wall surface, and an inverted wide section 10c for forming the inverted recess 9 in the sipe inner wall surface.

The sipe blade 10 is drawn out in the direction of arrow in FIG. 11 after tire molding. However, since the wide section 10b is exposed on the tread surface and also formed tapered toward the sipe bottom, no resistance occurs between the sipe blade and the tread rubber in mold opening. The inverted wide section 10c passes through the tread rubber from the sipe bottom to the tread surface in mold opening.

Even in this case, the inverted wide section 10c is formed tapered toward the sipe opening, and the tapered side is a front end in drawing out the sipe blade 10. Thus, there is no inflection point to be a catch between the sipe blade and the tread rubber, thereby allowing the sipe blade to be smoothly drawn out with low resistance while gradually elastically deforming the tread rubber. This can provide a pneumatic tire that can be easily molded without damage in mold opening.

A sipe blade used in the first embodiment includes only a wide section 10b and does not include an inverted wide section 10c, and thus of course, no resistance occurs between the sipe blade and the tread rubber in mold opening.

Examples

Now, the present invention will be described in more detail with examples, but the present invention is not limited to the examples as long as it is within the gist of the invention.
[Production of Tire]

As shown in Table 1, pneumatic radial tires shown in the first and second embodiments were actually produced, and performances thereof were evaluated. Specifically, in a tread pattern in FIG. 1, a tire having a sipe 5 formed with a wide section 5b of a triangular pyramidal shape in FIG. 2 was Example 1, and a tire having a sipe 5 formed with a wide section 5b of a triangular pyramidal shape and an inverted wide section 5c in FIG. 10 was Example 2.

Figure 12:
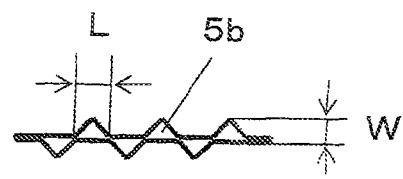
FIG. 12 is a plan view of a wide section of a sipe formed in Examples 1 and 2 and Comparative example 2.
Figure 13:
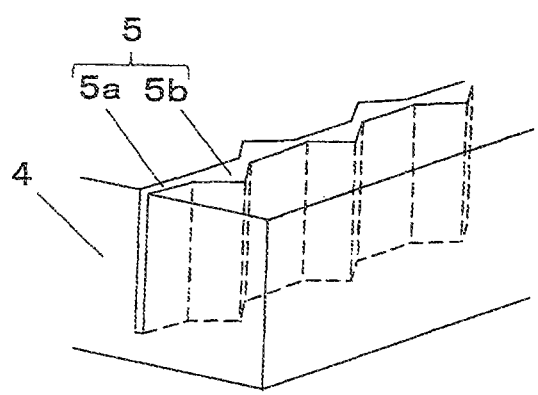
FIG. 13 is a perspective view of a block formed in Comparative example 2.
Figure 14:
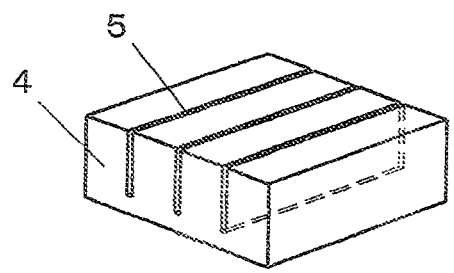
FIG. 14 is a perspective view of a conventional block formed in Comparative example 1.

In a tread pattern in FIG. 1, a tire having a sipe 5 that is not formed with a wide section 5b (see FIG. 14) was Comparative example 1, and a tire having a sipe 5 formed with a wide section 5b of a triangular prism shape from an opening end of the sipe to a sipe bottom as shown in FIG. 13 was Comparative example 2, and the tires were evaluated. The shapes of the wide sections 5b exposed on tread surfaces 1a of Examples 1 and 2 and Comparative example 2 were all the same triangular shape (length L: 3 mm×width W: 1.5 mm) as shown in FIG. 12, and in each of Examples 1 and 2, the wide section 5b was formed to converge on a sipe groove 5a just at a sipe bottom. The inverted wide section 5c in Example 2 had a just inverted shape of the wide section 5b. In Comparative example 2, the wide section 5b of the triangular prism shape was formed so that the triangular shape exposed on the tread surface 1a continues to a sipe bottom.

TABLE 1

|  | EXAMPLE 1 | EXAMPLE 2 | COMPARATIVE EXAMPLE 1 | COMPARATIVE EXAMPLE 2 |
|---|---|---|---|---|
| Sipe width (mm) |  |  |  |  |
| Wide section | 1.5 | 1.5 | — | 1.5 |
| Other section | 0.5 | 0.5 | 0.5 | 0.5 |
| Sipe length (mm) |  |  |  |  |
| Entire (X) | 23 | 23 | 23 | 23 |
| Wide section | 3 | 3 | — | 3 |
| Inverted wide section | — | 1.5 | — | — |
| Sipe structure | Wide section having triangular pyramidal shape (FIG. 2) | Wide section and inverted wide section having triangular pyramidal shape (FIG. 2) | Straight groove without wide section (FIG. 14) | Wide section having triangular prism shape (FIG. 13) |
| Ice performance (New) | 107 | 107 | 100 | 105 |
| Ice performance (wear) | 103 | 107 | 100 | 105 |
| Anti-wear performance | 100 | 99 | 100 | 95 |

[Evaluation Test]
Performance evaluation of each tire was performed as described below.
(1) Ice Braking Performance The tires were mounted to a car (FF Sedan of 2000 cc domestically produced), pneumatic pressure of all the tires was adjusted to 210 KPa, the car was traveled on an icy road under a load condition of two persons ride, and a braking distance when a braking force is applied at a speed of 40 km/h to operate an ABS was evaluated with an index. The evaluation is indicated using an index with an index of Comparative example 1 being 100, and larger numerical values indicate higher ice braking performance. Ice braking performance was evaluated twice when the tires were new and after the car traveled 8000 km on a dry pavement.
(2) Anti-Wear Performance The tires were mounted to a car (FF Sedan of 2000 cc domestically produced), pneumatic pressure of all the tires was adjusted to 210 KPa, a step wear amount (step between sipes due to wear) when the car traveled 8000 km on a dry pavement under a load condition of two persons ride was measured and evaluated with an index. The evaluation is indicated using an index with an index of Comparative example 1 being 100, and larger numerical values indicate higher anti-wear performance.
[Evaluation Results]

Table 1 shows evaluation results. Table 1 reveals that in Examples 1 and 2, the wide section is provided to significantly increase ice braking performance when the tires are new as compared with Comparative example 1, and performance equal to that of Comparative example 2 is obtained. Further, in Example 2, the inverted wide section is provided, and thus ice braking performance is not reduced when the tires wear, and performance equal to that of Comparative example 2 is maintained.

The wide section and the inverted wide section formed in Examples 1 and 2 have the same triangular pyramidal shape, and thus there is a small difference in rigidity in the block to prevent uneven wear on a land piece between sipes, and anti-wear performance is equal to that of Comparative example 1. On the other hand, in Comparative example 2, the wide section has the triangular prism shape, and thus there is a large difference in rigidity in the block to significantly reduce anti-wear performance as compared with Comparative example 1.

As described above, the pneumatic tire according to the present invention can increase ice braking performance without reducing anti-wear performance.

What is claimed is:

1. A pneumatic tire comprising:
   a plurality of land portions partitioned by grooves and formed in its tread surface; and
   at least one sipe formed in each of said land portions,
   wherein said sipe is formed so that sipe inner wall surfaces are formed perpendicularly to the tread surface, one or more recesses exposed on the tread surface are formed in at least one of said sipe inner wall surfaces opposed to each other, said one or more recesses have a sectional area gradually decreasing from an opening end of the sipe toward a sipe bottom and converges on the sipe inner wall surface before reaching the sipe bottom,
   wherein the length of said one or more recesses in the sipe depth direction is one third or more of the sipe depth,
   wherein the width of the one or more recesses gradually decreases from the opening end of the sipe toward the sipe b bottom, and
   wherein one or more inverted recesses having a sectional area gradually decreasing from the sipe bottom toward the sipe opening in a direction opposite to a direction of said one or more recesses are formed from the sipe bottom of said at least one of said sipe inner wall surfaces so as to converge on the sipe inner wall surface before reaching the opening end of the sipe.

2. The pneumatic tire according to claim 1, wherein a plurality of said recesses are formed in at least one of said sipe inner wall surfaces at intervals.

3. The pneumatic tire according to claim 2, wherein said recesses are formed in each of the sipe inner wall surfaces opposed to each other, and the recesses formed in the sipe inner wall surfaces opposed to each other are placed to be shifted from each other in a sipe length direction.

4. The pneumatic tire according to claim 1, wherein a plurality of said inverted recesses are formed in at least one of said sipe inner wall surfaces at intervals.

5. The pneumatic tire according to claim 4, wherein said inverted recesses are formed in each of the sipe inner wall surfaces opposed to each other, and the inverted recesses formed in the sipe inner wall surfaces opposed to each other are placed to be shifted from each other in a sipe length direction.

6. The pneumatic tire according to claim 1, wherein the width of the one or more inverted recesses gradually decreases from the sipe bottom toward the opening end of the sipe.

* * * * *

UNITED STATES PATENT AND TRADEMARK OFFICE
CERTIFICATE OF CORRECTION

PATENT NO.        : 8,708,011 B2
APPLICATION NO.   : 12/651511
DATED             : April 29, 2014
INVENTOR(S)       : Hiroyuki Matsumoto Page 1 of 1

It is certified that error appears in the above-identified patent and that said Letters Patent is hereby corrected as shown below:

In the Claims

Column 9, Line 27, Claim 1, delete "sipe b" and insert --sipe--.

Signed and Sealed this
Fifth Day of August, 2014

Michelle K. Lee
*Deputy Director of the United States Patent and Trademark Office*